United States Patent [19]

Karbachsch et al.

[11] Patent Number: 5,043,068
[45] Date of Patent: Aug. 27, 1991

[54] TUBULAR FILTER ELEMENT WITH AXIALLY YIELDABLE SECTION

[75] Inventors: Massoud Karbachsch, Göttingen; Herbert Radmacher, Bad Kreuznach; Michael Becker, Sobernheim, all of Fed. Rep. of Germany

[73] Assignee: Seitz-Filter-Werke Theo & Geo Seitz GmbH and Co., Bad Kreuznach, Fed. Rep. of Germany

[21] Appl. No.: 356,989

[22] Filed: May 24, 1989

[30] Foreign Application Priority Data

May 26, 1988 [DE] Fed. Rep. of Germany ....... 3817793

[51] Int. Cl.⁵ ............................................. B01D 27/08
[52] U.S. Cl. ...................... 210/350; 210/458; 210/497.01; 55/475
[58] Field of Search ............... 210/323.2, 435, 437, 210/458, 484, 485, 486, 487, 489, 493.2, 497.01, 497.2, 500.21, 350; 55/500, 521, 375, 475, DIG. 31; 156/218

[56] References Cited

U.S. PATENT DOCUMENTS

| | | |
|---|---|---|
| 3,591,010 | 7/1971 | Pall et al. ............................ 210/493 |
| 3,592,766 | 7/1971 | Kudlaty ............................... 210/232 |
| 3,642,141 | 2/1972 | Hobson, Jr. ......................... 210/323 |
| 4,442,004 | 4/1984 | Smith et al. ......................... 210/332 |
| 4,521,309 | 6/1985 | Pall ................................... 210/493.2 |
| 4,588,464 | 5/1986 | Miyagi ................................. 156/218 |
| 4,664,801 | 5/1987 | Thomas ............................. 210/493.2 |
| 4,929,354 | 5/1990 | Meyering et al. ................. 210/493.2 |

FOREIGN PATENT DOCUMENTS

| | | |
|---|---|---|
| 924802 | 3/1955 | Fed. Rep. of Germany . |
| 3407956 | 9/1984 | Fed. Rep. of Germany . |
| 3318940 | 11/1984 | Fed. Rep. of Germany . |
| 580133 | 8/1946 | United Kingdom . |
| 763782 | 12/1956 | United Kingdom . |
| 938518 | 10/1963 | United Kingdom . |
| 1027335 | 4/1966 | United Kingdom . |
| 1595684 | 8/1981 | United Kingdom . |
| 2140317 | 11/1984 | United Kingdom . |

Primary Examiner—Robert A. Dawson
Assistant Examiner—Wanda L. Millard
Attorney, Agent, or Firm—Herbert Dubno

[57] ABSTRACT

A filter cartridge has a support structure consisting of at least one tube provided with openings over its entire length and having at least one axially yieldable annular zone to permit axial movement to compensate for axial stresses and prevent damage to the filter material supported by the structure.

17 Claims, 6 Drawing Sheets

TUBULAR FILTER ELEMENT WITH AXIALLY YIELDABLE SECTION

FIELD OF THE INVENTION

Our present invention relates to a tubular filter element, especially a cartridge-type or candle-type filter which comprises a support structure carrying a filter body and which is elongated and generally cylindrical.

BACKGROUND OF THE INVENTION

Filter cartridges or candle-type filters generally comprise a support structure which is elongated and generally cylindrical and which are provided with a axially extending filter body supported by the structure. The support structure can comprise at least one tube formed with throughgoing opening and closed at its ends by respective end caps.

Filter cartridges of this type can use a wound or pleated filter layer as the filter body and the filter body should be sealingly closed at the two end caps to allow the filter material to be forced through the filter body without escaping around the filter material an without passing between the filter layer and an end cap.

With conventional tubular filter elements, especially filter cartridges, of this type, the tube or tube pair provided between the end caps is not capable of sustaining significant axial yieldability. The central or inner tube of the tube pair can be inserted in corresponding annular grooves formed in the inner phases of the end caps while the support or outer tube has both of its ends fixed to the end caps.

The support structure of conventional tubular filter as filter candles or candle filters because of their shapes, is generally composed of a plastic inert to the material to be filtered, the support structure having a coefficient of expansion or contraction when subjected to the effects of external factors such as changing temperature during filtration or sterilization with steam or the like, which differ from those of the respective filter body.

The filter body or the wound or pleated filter layer can thus be subjected to axial tensile or compressive stress which can cause mechanical damage to the filter. For example the filter layers may show local microcracks which can permit the material to be filtered to break through in an unfiltered manner. Other filter bodies can be damaged in other ways. The problem is most pronounced with sensitive filter layers such as filter membranes.

OBJECTS OF THE INVENTION

It is, therefore, the principal object of the present invention to provide a filter element, especially a filter cartridge or filter candle of the type in which a filter body or layer is retained in a support structure, whereby axial tensile and compressive stresses will not cause mechanical damage to the filter material.

Another object of this invention is to provide an improved, relatively simple cartridge-type filter which is less sensitive to differences in coefficients of extension and contraction than earlier filter elements.

Still another object of this invention is to provide an improved cartridge-type filter which is free from the disadvantages of earlier systems.

SUMMARY OF THE INVENTION

These objects and others which will become apparent hereinafter are attained, in accordance with the present invention in a filter cartridge or candle-type filter which comprises:

a tubular support structure having at least one tube extending axially substantially over a full filtering length of the tubular filter element, the tube being formed with openings spaced apart circumferentially and axially and distributed substantially over a full length of the tube, the tube being formed over at least a portion of the length of the tube with an axially yieldable but radially substantially rigid section;

a filter material on the support; and respective end cap secured to and sealingly closing opposite respective ends of the structure whereby a fluid traversing the tube passes through the openings and the filter material and is thereby filtered, whereby axial stresses are relieved by axial extension or contraction of the tube.

In the cartridge-type filter of the invention, therefore, a tube of the support structure is formed with openings over its entire length along which the filter material is provided. The tube, however, has at least a section of its length which is yieldable in the axial direction over the entire circumference of this section but in the radial direction is substantially fixed in its dimensions.

Because of the axial yieldability of the support structure, different axial extension and contraction characteristics of the filter body and the support structure can be compensated by the axial extension or contraction of the support structure.

Any axial stresses in tension or contraction which might have been applied to the filter body even in the case of very sensitive filter layers, are therefore absorbed by the axial yieldability of the support structure so that there is no risk of mechanical damage to the sensitive filter layers such as filter membranes.

The axial yieldable tube section can be formed by providing the throughgoing openings of the tubes in row of openings spaced apart by axial limbs of the tube. The limbs can be axially stretchable and compressible in an elastic or resilient manner. This has the special advantage that the yieldable tube section can have a characteristic elastic self-restoring property in the axial direction so that, upon relaxation of the elastic stress, the original dimensions can be restored.

The elastically yieldable limbs of the latter tube section can be formed by making the limbs arcuate, angled and, in the latter case, of a zig-zag configuration.

Advantageously, two axially neighboring rows of openings can be offset from one another angularly so that the axial limbs between the openings of one row are staggered with respect to the axial limbs of the openings of an adjoining row, with the circumferential limbs joining to axially staggered limbs being resiliently yieldable. In this case, the axial limbs need not be axially yieldable in themselves although some axial yieldability of the axial limbs can be provided in the manner described.

As long a the deformation of the circumferential limbs is small, their deformation has no influence upon the diameter of the tube, i.e. no effect in the radial direction.

When, however, large deformations are to be expected, radial deformation of the elastic tube section can occur and to avoid this, it has been found to be advantageous to make the circumferential limbs also some what deformable in their lengths, i.e. by imparting an arcuate, angled or zig-zag configuration to them.

According to another feature of the invention the axial yieldability and radially dimensional stable section can be formed by providing the tube from at least two tube segments which have parts overlapping one another and telescopingly interfitted with one another and formed, where they overlap, with formations, e.g. ribs and troughs, which mate with one another to prevent relative rotation while permitting relative axial displacement. One such axially yieldable junction can be provided between two tube segments whose opposite ends can be welded or cemented fixedly to the respective end caps.

In such a construction, relatively large differences in axial deformability of the filter body and the support structure can be compensated while ensuring a certain restoring force and maintaining the axial retention forces which are applied to the tubular filter element or cartridge within a filtering apparatus.

The means previously described for preventing relative rotation of the tube segments prevents twisting of the filter body as tensile and compressive stresses are generated.

In a preferred embodiment of the invention, the support structure comprises an outer support tube and an inner or central tube, each formed with the aforementioned arrays of throughgoing openings. Advantageously, the outer or support tube will be provided with two axially yieldable tube segments having elastically stretchable contractible axial limbs between the openings, while the central or inner tube has the overlapping junction formed by two tube segments in the manner described. In this case, the axial restoring force is provided upon axial extension or contraction of the outer tube since each inner tube segment is connected to a respective end of the outer tube by the respective end cap.

According to another feature of the invention, a guide pin is formed at one end of the filter cartridge and comprises three S-section guide webs oriented at 120° with respect to one another. These guide webs are joined together at the center, in the region of the axis of the cartridge, e.g. by welding and the outer S-shanks form three bar-like peripheral wall portions of the guide which can be inserted in a cylindrical receiver and can hold the filter element securely in the radial direction with high stability.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
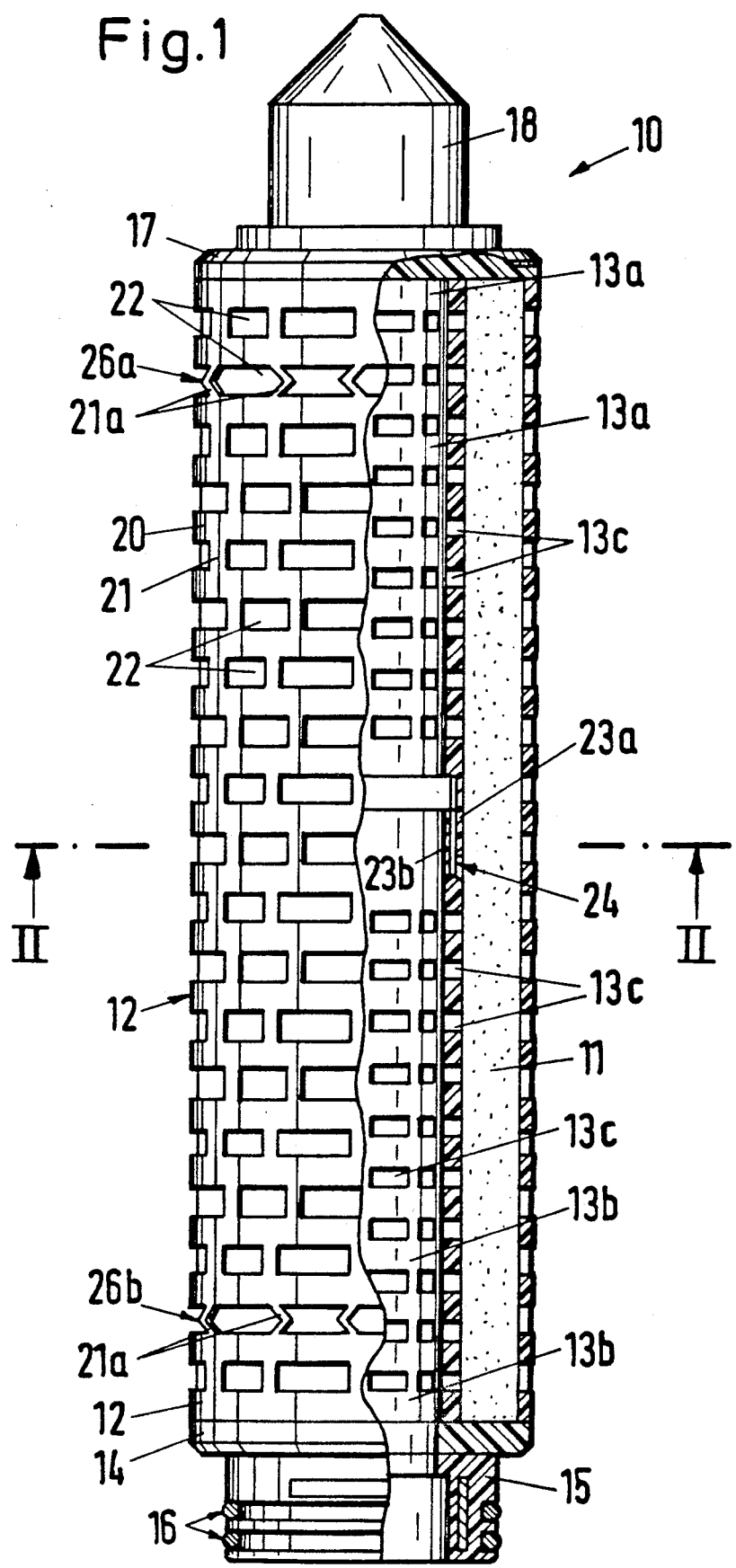
FIG. 1 is a side elevational view, partly in axial section illustrating a filter cartridge according to the invention.
Figure 2:
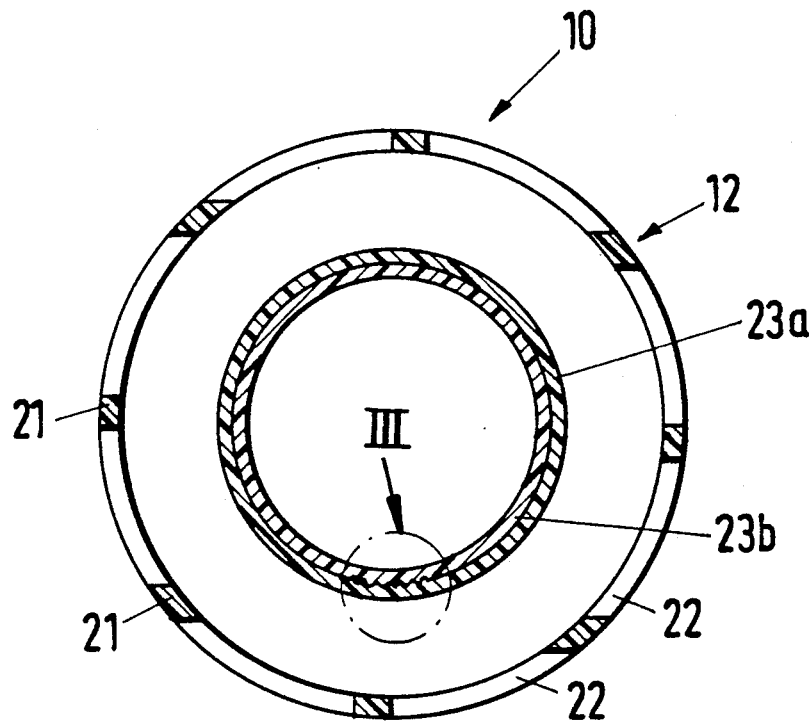
FIG. 2 is a section taken along the line II—II of FIG. 1.
Figure 3:
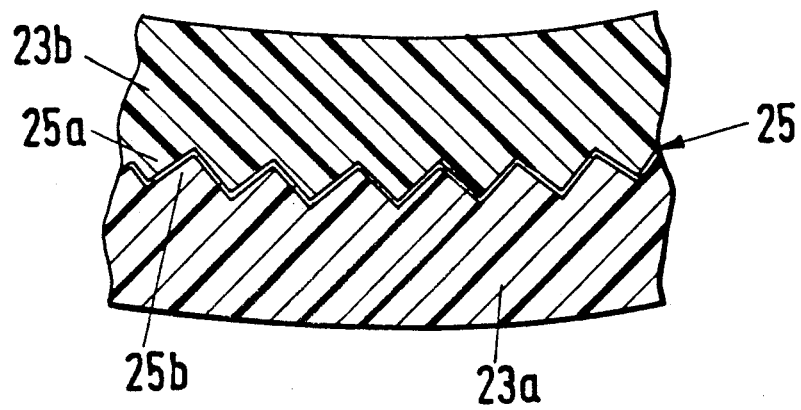
FIG. 3 is a section representing the detail III of FIG. 2.

The filter cartridge shown in FIGS. 1 through 3 comprises a conventional filter body 11 which can be wound filter material, pleated filter material, or pressed filter material or any other conventional porous, semiporous or permeable material upon which, with passage of a fluid through the filter body, a substance to be filtered out of that fluid can collect. Preferably the body 11 represents a pleated filter membrane.

The filter body is held in a support structure which, in the embodiment illustrated in FIGS. 1 through 3, comprises an outer support tube 12 which forms the outer surface or mantle of the filter cartridge, a central or inner tube 13a, 13b which is coaxial with the outer tube, a lower end cap 14 provided with a bushing or fitting 15 formed with seating means 16 and which can be inserted into a lower fitting of a filter apparatus, i.e. in a filter housing, and an upper end cap 17 provided with a pin 18, e.g. a filter plate, which can fit into a retainer at the upper end of this housing (not shown).

The outer tube 12 has throughgoing openings 22 spaced apart in circumferential rows which, in turn, are axially spaced from one another and which open from the exterior onto the filter body. These openings 22 are bounded by axially extending limbs 21 and are separated from the adjoining rows by circumferentially extending limbs 20.

The central tube 13a, 13b has throughgoing openings 13c which open from the filter body 11 to the interior of this tube which serves to conduct the filtrate away from the filter body. The openings 13c can be provided similarly in circumferential rows and rows which are axially spaced from one another over the entire lengths of the respective tube segments and hence the entire axial length of the filter body 11.

In the illustrated embodiment, the central tube is composed of two axially adjoining tube segments 13a and 13b which with their parts turned toward one another at 23a and 23b, axially overlap and are telescopingly interfitted so that a tube section 24 is formed which can be extended in the axial direction or contracted axially.

As FIGS. 2 and 3 show on the outer side of the tube end 23b and on the inner side of the tube end 23a axially extending and mating guide elements 25 are provided in the form of axial ribs 25a and 25b separated by grooves which, like the ribs, have angular cross sections. Of course, any other spline arrangement with axial ribs and grooves of other cross sectional shape can be used as guide elements preventing relative rotation of the tube segments if desired.

In the illustrated embodiment, moreover, the outer tube 12 can be seen to have two axially yieldable tube sections 26a, 26b in which the upper section 26a, 26b in which the upper section 26a is located in the upper quarter of the tube 12 while the other tube section 26b is located in the lower quarter of the tube.

In the embodiment of FIG. 1, the axially extending limbs 21a between the openings 22 of the two tube sections 26a and 26b are angled or of angular configuration so that these limbs buckle elastically to a greater extent upon axial compression and stretch out upon the application of axial traction to the tube 12 in an elastic manner. In either direction of axial stress, the limbs 21a generate a restoring force which, although small, is sufficient to restore the support structure to shape without permitting damage, however, to the filter body 11 as the axial stress is absorbed in an elongation or contraction of the tube.

In the embodiment of FIG. 1, moreover, the support tube 12 having the axially elastically stretchable and compressible limbs 21a in the tube sections 26a and 26b is combined with an inner tube 13a, 13b formed with the telescope junction previously described.

Since the filter element 10 is traversed by the fluid from the exterior inwardly, the telescope junction in the axially yieldable tube section 24 is protected within the filter body 11 against lateral buckling and jamming while the outer tube 12 absorbs the axial stress and generates the restoring force along the largest periphery of the cartridge, i.e. in the sections 26a and 26b along the outer circumference.

Figure 4:
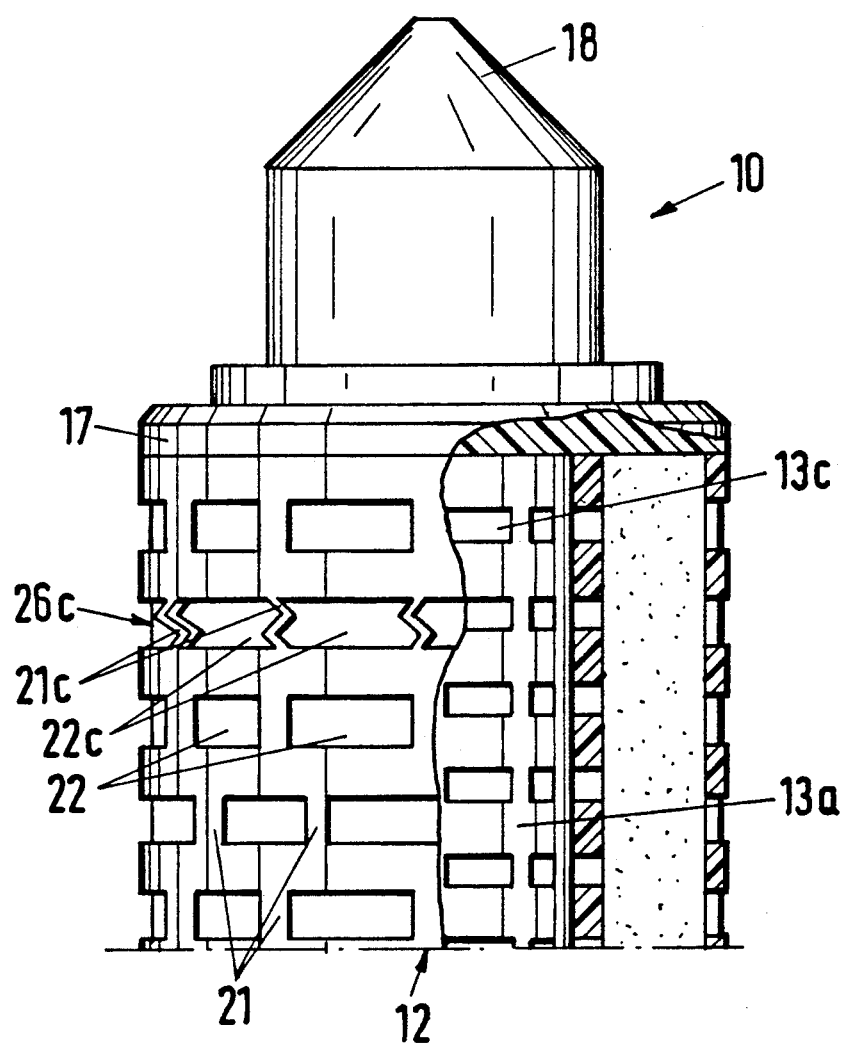
FIG. 4 is an elevational view, partly in axial section, of the top of a filter cartridge which is a modification of the filter cartridge of FIG. 1 with respect to the means for providing axial yieldability.

FIG. 4 shows a modification of the structure by comparison with the arrangement of FIG. 1, in which the outer tube 12 is yieldable in the axial direction but is of substantially fixed dimension in the radial direction. Here the limbs 21c have a zig-zag configuration, thereby increasing the range of axial mobility and the development of restoring forces by comparison of the embodiment of FIG. 1.

Figure 5:
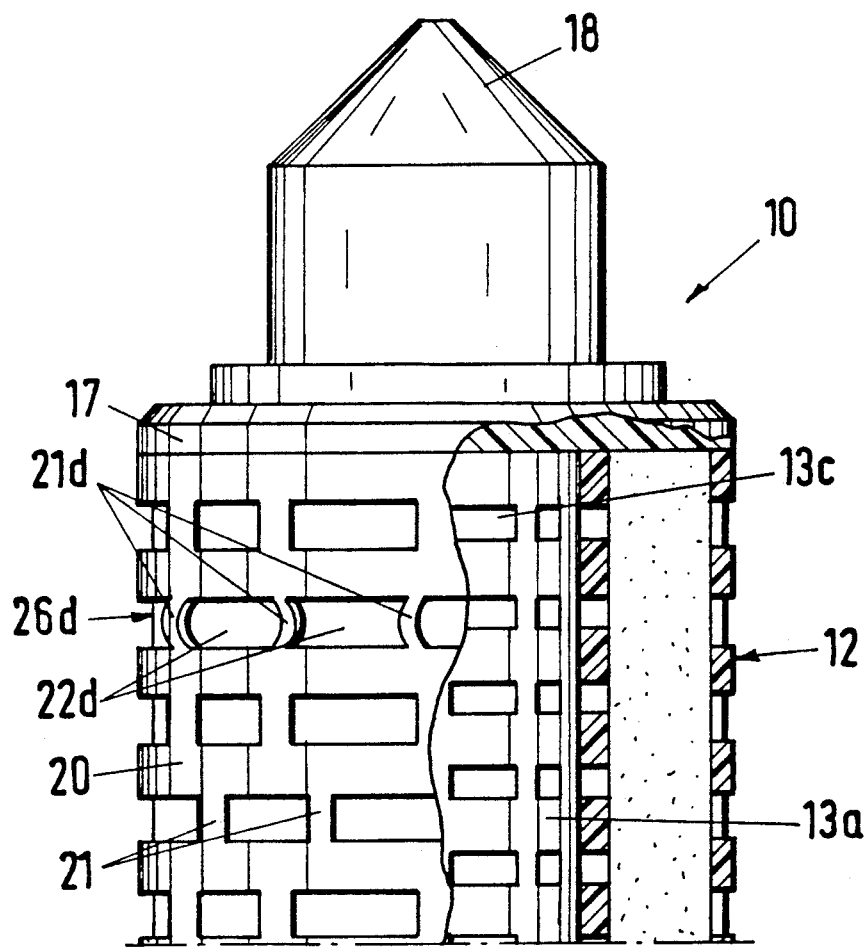
FIG. 5 is a view similar to FIG. 4 showing a further modification.

Another variation along these lines can be seen in FIG. 5 where the axially extending elastic limbs are arcuate and, over each opening, are bode in opposite circumferential directions. The axially extending tube section 26d has the openings 22d which have limbs between them which are represented at 21d.

Figure 6:
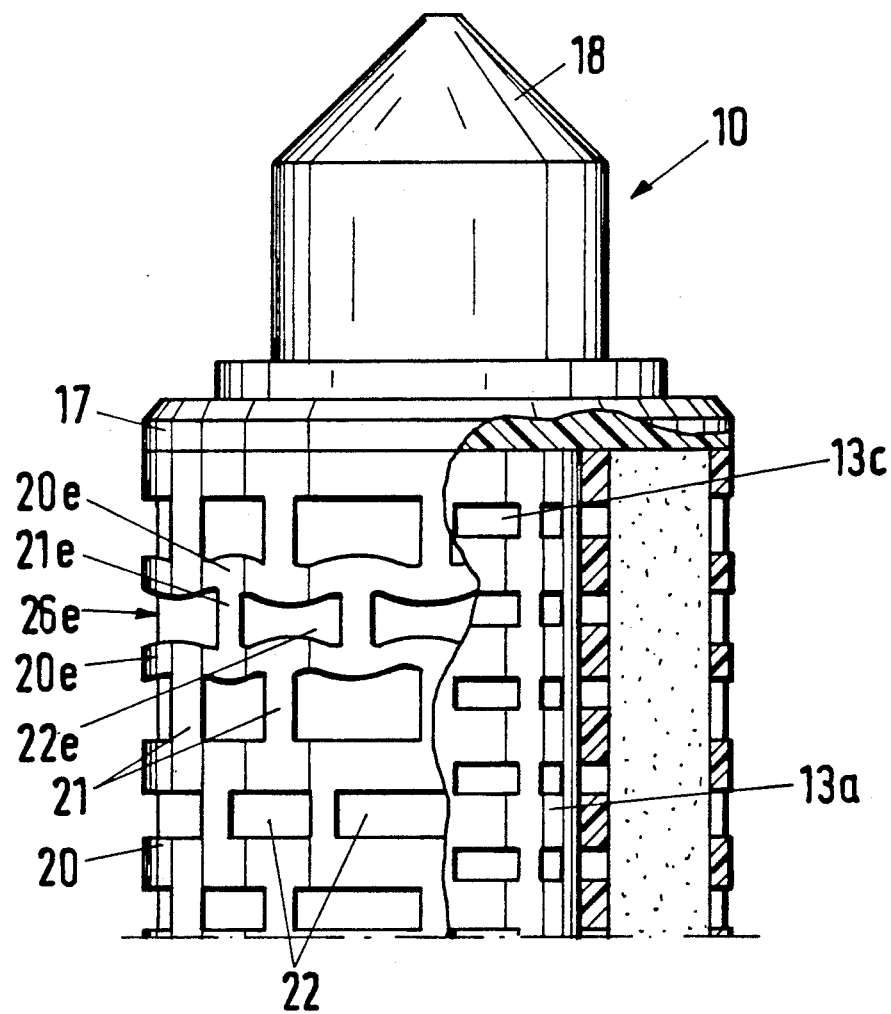
FIG. 6 is another view similar to FIG. 4 illustrating a third modification.

A further variant has been illustrated in FIG. 6. In this case the axially yieldable and substantially radially fixed tube section 26e has its rows of openings 22 offset from row to row so that each axially extending limb 21e of one row is staggered with respect to the limbs 21 of adjoining rows and, indeed, lies substantially midway between these latter limbs. The openings 22e are also bounded by circumferentially extending limbs 20e which, as shown in the drawing, have a wavy configuration so that they can be easily bent in the axial direction without significant deformation in the radial direction.

Figure 7:
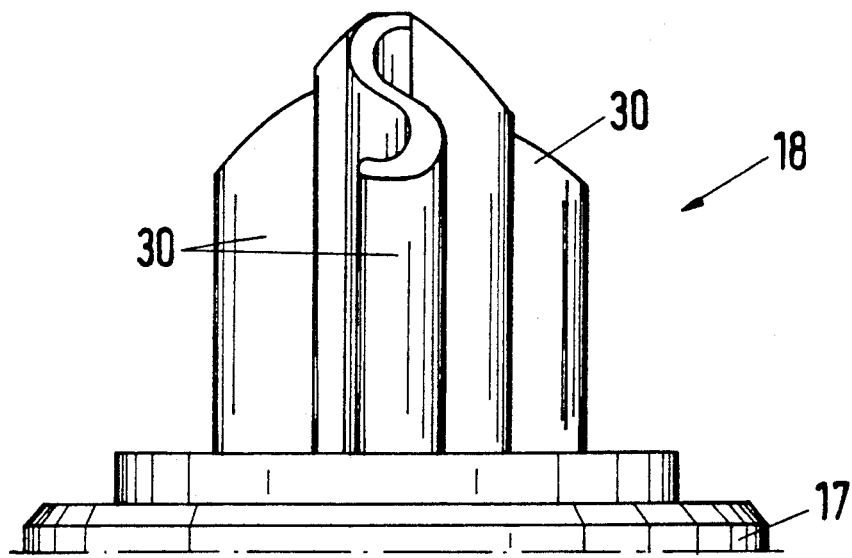
FIG. 7 is a side view of a guide pin formation according to the invention which can be used in place of the guide pin of FIG. 1.
Figure 8:
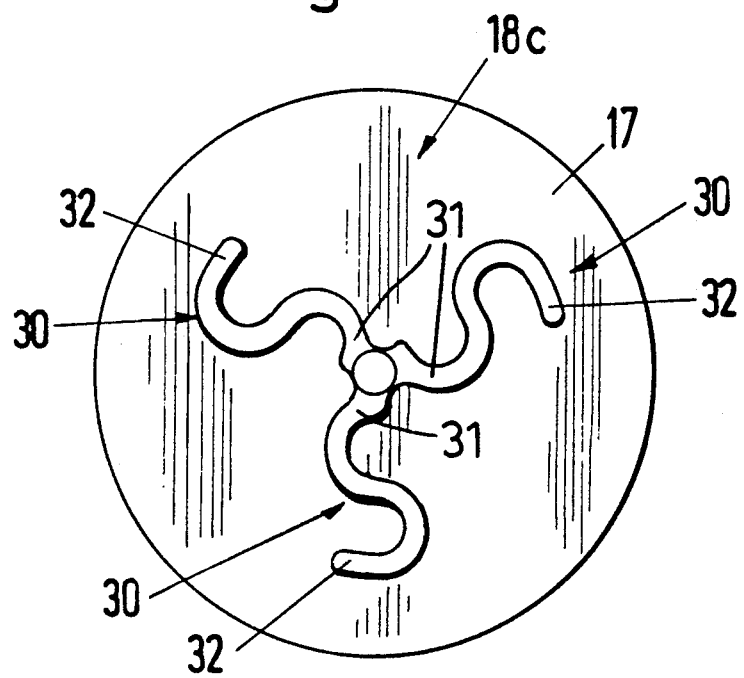
FIG. 8 is a plan view of the guide pin of FIG. 7.

FIGS. 7 and 8 illustrate a preferred configuration of the guide pin 18 formed on the upper end cap 17. The guide element 18c having three S-shaped guide bars 30 spaced apart from one another by 120°. One of the S shanks 31 of each guide bar 30 is joined to the others in the central or axial region of the pin, e.g. by welding while the outer S shanks 32 lie along the periphery of the pin 18 so as to form three peripheral wall portions which act as a guide pin insertion of the cartridge into the upper socket in the housing. The guide element 18 is yieldable in the radial directions of each of these guide bars because of the S shape, and thus provides a cushioning effect in each of three directions oriented at 120° from one another. The cartridge can thus be retained by the upper end cap in a sleeve or hole-type socket in the filter unit.

We claim:

1. A tubular filter element, comprising:
   a tubular support structure including an outer tube and a central inner tube, said inner and outer tubes both being formed with respective arrays of circumferentially spaced openings distributed over substantially full lengths of said tubes, said outer tube being formed with at least one axially yieldable sections having the circumferentially spaced openings thereof separated by axially yieldable axially extending limbs capable of axial elastic elongation and contraction, said central inner tube being formed of a plurality of axially adjoining tube segments, each two neighboring axially adjoining segments being formed with telescopingly interfitted overlapping parts constituting an axially yieldable joint;
   a filter material received between said tubes on said support; and
   respective end caps secured to and sealingly closing opposite respective ends of said structure whereby a fluid traversing said tube passes through said openings and said filter material and is thereby filtered, whereby axial stresses are relieved by axial extension or contraction of said tube and said joint.

2. The tubular filter element defined in claim 1 wherein said outer tube is formed with two of said axially yieldable sections.

3. The tubular filter element defined in claim 2 wherein said overlapping parts are provided with mating formations enabling relative axial displacement of said parts but coupling said parts against relative rotation.

4. The tubular filter element defined in claim 3 wherein the circumferentially spaced openings of said outer tube are separated by axially yieldable axially extending limbs capable of axial elastic elongation and contraction to form said sections.

5. The tubular filter element defined in claim 4 wherein said limbs of said outer tube are angular in configuration.

6. The tubular filter element defined in claim 5 wherein said limbs of said outer tube are of zig-zag configuration.

7. The tubular filter element defined in claim 4 wherein said limbs of said outer tube are arcuate.

8. The tubular filter element defined in claim 3 the circumferentially spaced openings of said outer tube are formed in circumferential rows and are separated by axially yieldable axially extending limbs and the limbs of successive axially spaced rows are angularly staggered about the circumference of said tube to permit axial distortion of the axially extending limbs of successive rows together with circumferentially extending limbs therebetween to form said sections.

9. The tubular filter element defined in claim 8 wherein said circumferentially extending limbs are elastically stretchable.

10. A tubular filter element, comprising:
    a tubular support structure having at least one tube extending axially substantially over a full filtering length of the tubular filter element, said tube being formed with openings spaced apart circumferentially and axially and distributed substantially over a full length of said tube, said tube being formed over at least a portion of said length of said tube with an axially yieldable but radially substantially rigid section, said openings spaced circumferentially being separated by axially yieldable axially extending limbs capable of axial elastic elongation and contraction to from said radially rigid section;
    a filter material on said support; and
    respective end caps secured to and sealingly closing opposite respective ends of said structure whereby a fluid traversing said tube passes through said openings and said filter material and is thereby filtered, whereby axial stresses are relieved by axial extension or contraction of said tube.

11. The tubular filter element defined in claim 10 wherein said limbs are angular in configuration.

12. The tubular filter element defined in claim 11 wherein said limbs are of zig-zag configuration.

13. The tubular filter element defined in claim 10 wherein said limbs are arcuate.

14. A tubular filter element, comprising:
a tubular support structure having at least one tube extending axially substantially over a full filtering length of the tubular filter element, said tube being formed with openings spaced apart circumferentially and axially and distributed substantially over a full length of said tube, said tube being formed over at least a portion of said length of said tube with an axially yieldable but radially substantially rigid section, said openings spaced circumferentially being formed in circumferential rows and being separated by axially yieldable axially extending limbs, the limbs of successive axially spaced rows being angularly staggered about the circumference of said tube to permit axial distortion of the axially extending limbs of successive rows together with circumferentially extending limbs therebetween to form said radially rigid section;
a filter material on said support; and
respective end caps secured to and sealingly closing opposite respective ends of said structure whereby a fluid traversing said tube passes through said openings and said filter material and is thereby filtered, whereby axial stresses are relieved by axial extension or contraction of said tube.

15. The tubular filter element defined in claim 14 wherein said circumferentially extending limbs are elastically stretchable.

16. A tubular filter element, comprising:
a tubular support structure having at least one tube extending axially substantially over a full filtering length of the tubular filter element, said tube being formed with openings spaced apart circumferentially and axially and distributed substantially over a full length of said tube, said tube being formed over at least a portion of said length of said tube with an axially yieldable but radially substantially rigid section, said tube being formed with a plurality of axially adjoining tube segments, each two neighboring axially adjoining segments being formed with telescopingly interfitted overlapping parts constituting an axially yieldable joint;
a filter material on said support; and
respective end caps secured to and sealingly closing opposite respective ends of said structure whereby a fluid traversing said tube passes through said openings and said filter material and is thereby filtered, whereby axial stresses are relieved by axial extension or contraction of said tube.

17. The tubular filter element defined in claim 16 wherein said overlapping parts are provided with mating formations enabling relative axial displacement of said parts but coupling said parts against relative rotation.

* * * * *